S. G. BONAPARTE.
BAKING MACHINERY.
APPLICATION FILED NOV. 20, 1911.

1,115,384.

Patented Oct. 27, 1914.
3 SHEETS—SHEET 2.

WITNESSES:
Wm G Blomstran
Edwin B Nelson

INVENTOR
Swan G. Bonaparte
BY J. Harner Peekstrom
ATTORNEY

S. G. BONAPARTE.
BAKING MACHINERY.
APPLICATION FILED NOV. 20, 1911.
1,115,384.
Patented Oct. 27, 1914.
3 SHEETS—SHEET 3.
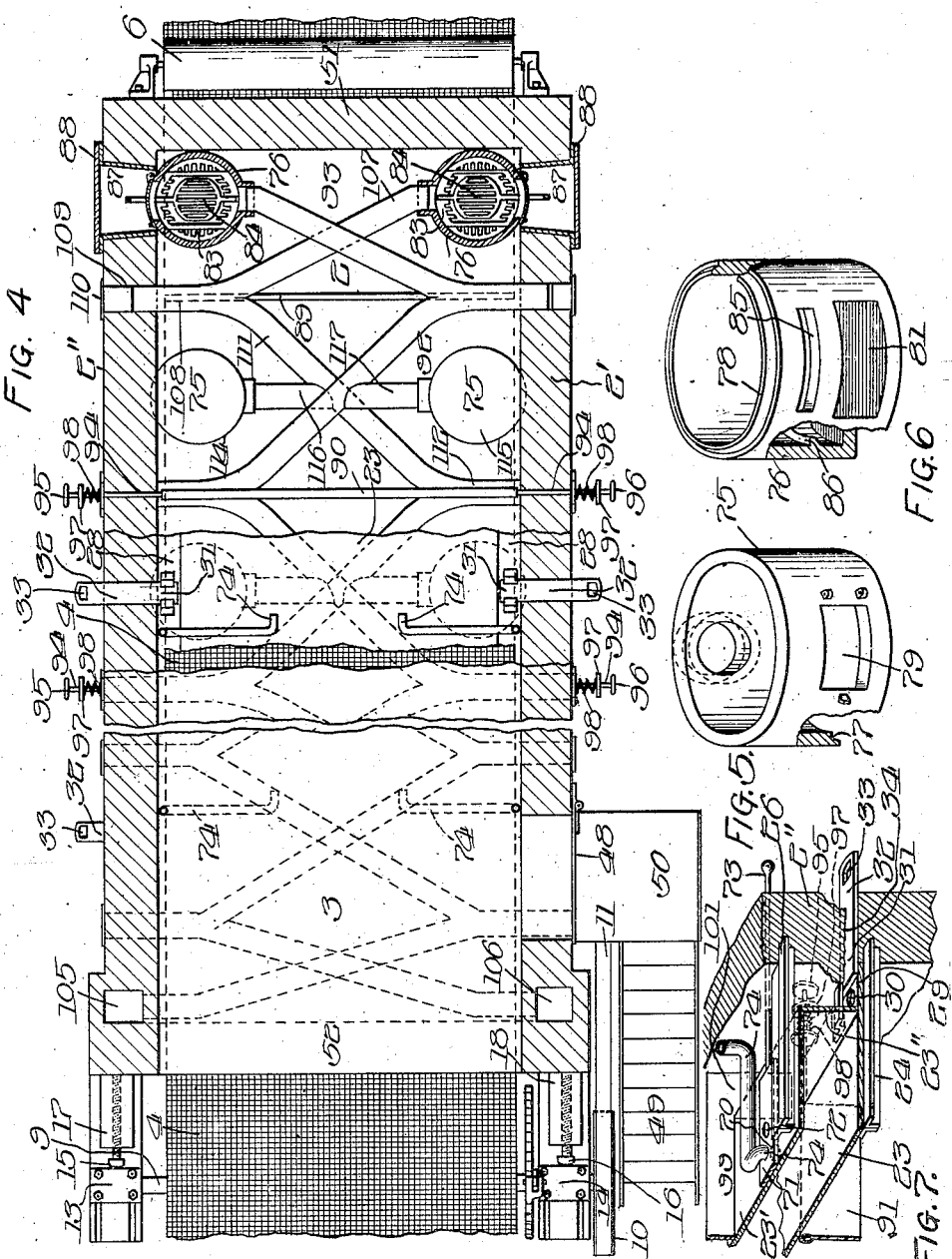
WITNESSES:
INVENTOR
ATTORNEY

UNITED STATES PATENT OFFICE.

SWAN G. BONAPARTE, OF CHICAGO, ILLINOIS.

BAKING MACHINERY.

1,115,384.  Specification of Letters Patent.  Patented Oct. 27, 1914.

Application filed November 20, 1911. Serial No. 661,367.

*To all whom it may concern:*

Be it known that I, SWAN G. BONAPARTE, a subject of the King of Sweden, residing at Chicago, in the county of Cook and State of Illinois, have invented certain new and useful Improvements in Baking Machinery, of which the following is a specification.

My invention relates to baking appliances and has particular reference to an oven and a mechanism connected therewith for baking bread.

The object of the invention is to produce a baking-plant adapted to rapidly, uniformly and economically bake the thin disks of bread known by various names, such as "hard-tack", "health-bread", etc., and with this object in view my invention consists of the novel construction, combination and arrangement of parts hereinafter described in detail, illustrated in the accompanying drawing and incorporated in the appended claim.

Figure 1:
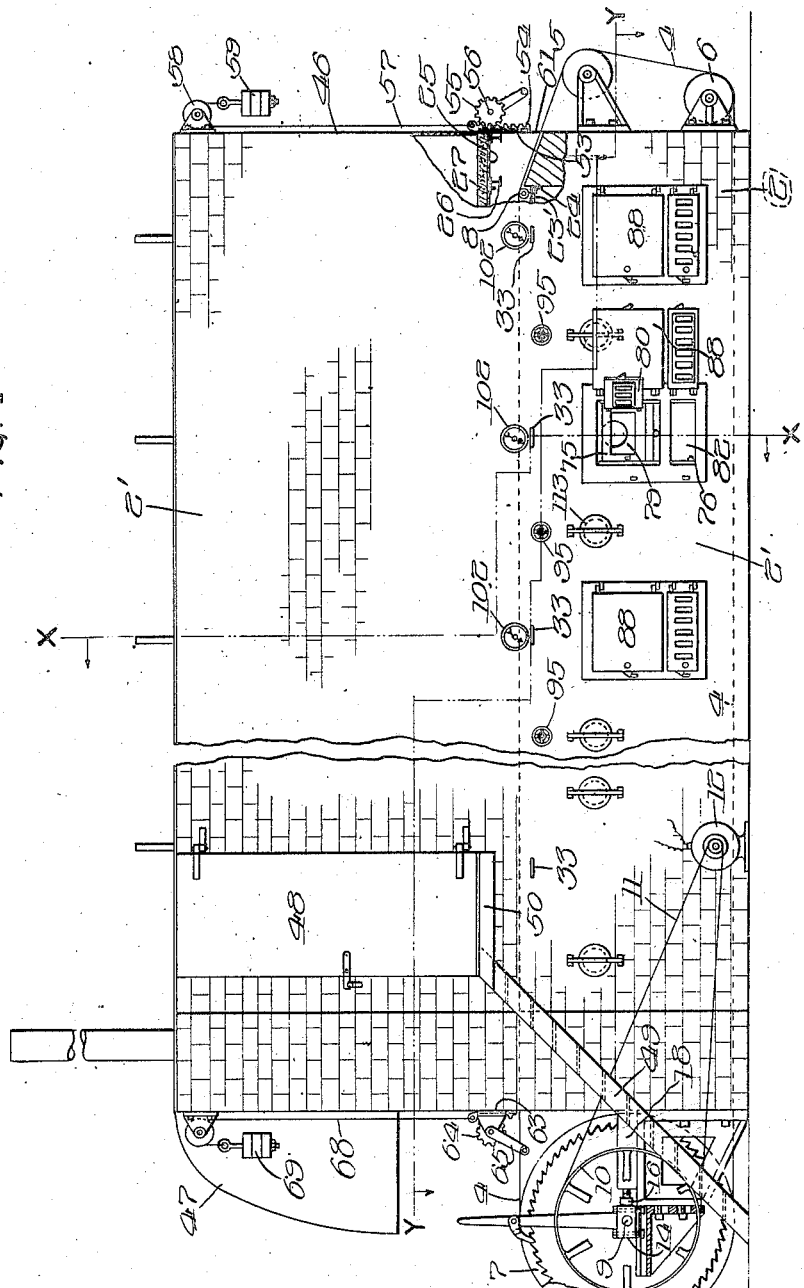
Figure 2:
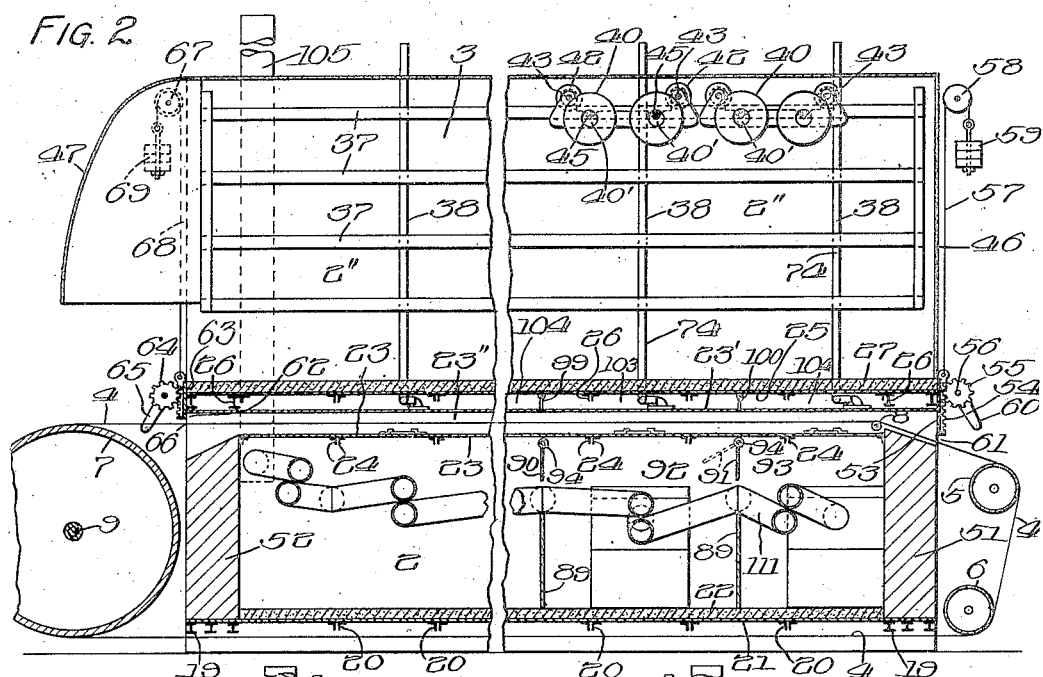
Figure 3:
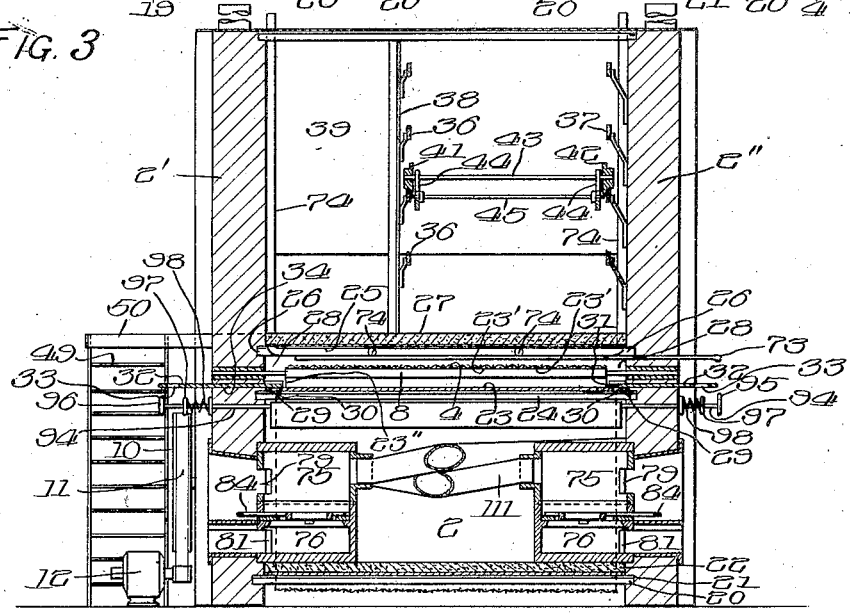

In the drawing—Figure 1 is a side elevation, partly in section and partly broken away, of a baking-plant embodying my invention. Fig. 2 is a longitudinal and vertical section of same, partly broken away. Fig. 3 is a section taken substantially on line X—X of Fig. 1. Fig. 4 is a horizontal section taken substantially on line Y—Y of Fig. 1. Figs. 5 and 6 are enlarged perspective views of the sections of one of the fire-pots, parts being broken away to show their interior construction. Fig. 7 is a perspective view of one corner, enlarged, of a sheet-iron casing through which passes an endless apron or carrier that conveys the bread through the oven during a continuous baking process. This view also shows parts of the structure immediately associated with said casing.

Referring in detail to the several views, 2 represents the space in the lower part of the structure and same is occupied by a series of fire-pots, flues and dampers by means of which the heat may be shifted in intensity from one place to another along the path that the bread or baking dough travels.

2' and 2" represent the side-walls of the structure which are extended upwardly to form a drying-room 3 to which the baked bread is transferred as it issues on an endless apron through the rear end of the baking path. This apron, 4, passes over the oven-space, or room 2 for the fire-pots from front to rear and returns underneath same, and is preferably made of wire-gauze. The apron runs on or is supported by drums 5, 6 and 7 and such intermediate drums or rollers 8 as may be necessary. The rear drum 7 rotates on the axis of a shaft 9 to which said drum is keyed, and this shaft is rotated by a pulley 10 which is driven by a belt 11 connected with the pulley of a motor 12, or other suitable power. The ends of the shaft 9 are mounted on slidably adjustable bearings 13 and 14, hence the rear drum may be adjusted relatively to the forward supports for the apron to tighten or take up slack in the latter. The bearings 13 and 14 are supported against forward movement by screws 15 and 16 that have threaded engagements with fixed blocks or nuts 17 and 18 as indicated in Figs. 1 and 4. The floor of the fire-pot space 2 is shown supported on transverse I-beams 19 and angle-irons 20. Said floor may be a sheet-iron bottom 21 on which is laid a layer 22 of cement, sand or other suitable non-combustible material. At its top the space 2 is closed by a sheet of iron 23 supported on angle-irons 24. The top 23 is also the bottom of a sheet-iron casing of rectangular form completed by a top-side 23' and vertical sides 23" as shown in Fig. 7 showing three of its four sides, the fourth side being identical with 23" shown in said Fig. 7.

The casing, which may be designated as a whole by its bottom numeral 23, is open at its forward and rear ends, the forward open end in Fig. 7 representing also the appearance of the rear open end. Over this casing 23, through which the apron 4 travels, is a sheet-iron floor 25 that is supported on angle-irons 26. On the floor 25 is a layer 27 of sand. Between the walls 2' and 2" and the vertical sides 23" of the casing are spaces 28, 28. The bottom 23 of the casing extends beyond its vertical sides 23" across the spaces 28 to the walls 2' and 2" thus closing the fire-pot space to the space above the casing. The projecting portion at each side is designated as 29. The bottom portions 29 have from end to end of the structure a series of openings 30 therethrough which are wholly or partially closed or opened by slides or covers 31 provided with handles 32 passing through the respective walls 2' and 2" and having on their outer ends knobs 33 which may be grasped by the operator. On an oven forty feet long there may be ten of these at each side between the walls 2' and 2" and the vertical sides of the casing, all identical with the construction shown in Fig. 7. By admitting the heat from below through certain of these openings the temperature of the baking heat may be varied over the top of the casing so as to apply a more intense top heat at one or more points from front to rear over the apron and the bread than at other points. Thus if the dough in the "rising bread" is slow to rise a moderate heat to assist the bread to rise may be applied during the beginning of its movement and when the bread has risen to the desired extent it will be immediately exposed to full baking heat. When the bread disks in the dough form are sufficiently raised when placed on the apron at the drum 5 the full baking heat may be directed to the front portion or forward end of the casing through which the apron travels. This variable application of heat along the path of travel is further controlled by a series of swinging heat shields or dampers underneath the casing hereinafter referred to and by the individual fire-pot arrangement shown, whereby the firing may be made more intense in certain fire-pots than others, or leaving certain fire-pots cold, according to the condition of the dough, the thicknesses of the disks, the surrounding temperature, etc., which make it necessary for the purpose of a rapid and continuous baking of thin disks of bread, to control the heat and the particular place of its application, with a great deal more exactness than is required for heavier and slower baking processes. As shown most plainly in Fig. 7 a series of slots 34 (only one of which is shown in Fig. 7 the others being identical) are made through the outer walls 2′ and 2″, and in these slots are slidably mounted closers 31. Between the top 23′ of the baking-space, or casing 23, 23′ and 23″, and the sheet-iron support 25 for the layer 27 of sand or other substance suitable to absorb and give out heat, is a heat-space several inches high through which heat is applied to the sides of the casing and conducted to the top of the casing by means of the closer-controlled heat-inlets 30. Fig. 7 shows the angle-irons that support the casing and also the angle-irons on which the layer 27 of sand is supported, but for the sake of a clearer illustration of the parts intended to be shown in this figure the layer of sand 27 is omitted.

Above the layer 27 is a drying-room 3. This room has a vertically subdivided space that forms a passageway 39, as shown to the left in Fig. 3. To the right of this passage-way, as seen in said figure, are tracks 36 and 37 that are supported on uprights 38 and the wall 2″. From said passage-way access is had to the drying-bread after it is baked, several disks of the bread being shown in Fig. 2 and labeled 40. This bread is of the usual disk-form having a hole 40′ through its center for the purpose of receiving a rod on which the drying bread is strung. On the tracks 36 and 37 are mounted trucks of flanged wheels 41 and 42, these wheels being mounted on axles, shafts or rods 43 (Figs. 2 and 3). These axles carry brackets on which the ends of rods 45 are supported. On these rods 45 the disks of bread are strung as shown.

The front end of the drying-chamber 3 is closed by a wall 46, while the rear end of this chamber is open and provided with a hood 47 that is a rearward and downward extension of the roof of the drying-chamber, and this hood conserves the heat therein for drying purposes and yet does not close the drying-chamber against the necessary air-ventilation. In the wall 2′ is a side door 48 which is reached by a stairway 49 at the head of which, immediately in front of said door, is a platform 50. The front end of the fire-pot space 2 is closed by a wall 51 and the rear end by a wall 52. These walls together with the walls 2′ and 2″ may be made of brick or stone, while the front wall 46 of the drying space may be made of sheet iron.

In Figs. 1 and 2 the open front end of the casing 23 is shown partly closed by a vertically movable door 53 on which is a rack 54 meshing with a pinion 55 on a shaft 56 mounted in suitable bearings on the front wall. This door is counterweighted by means of a cord, chain or other flexible connection 57 attached to the door and passing over a pulley 58. On the free end of this connection is a counterweight 59. The shaft 56 is provided with a crank 60 by means of which the rack and pinion may be operated to raise or lower the door 53. Below the lower edge of this door and between this edge and the apron is a normally open space 61 of sufficient width to permit the disks of bread after being placed on the outside portion of the apron to pass underneath the door into the interior of the oven or casing 23. The temperature at the immediate front end of the casing is also modified with the aid of this door by varying the size of the opening between its lower edge and the apron especially for the purpose of hastening or retarding the rising of the dough in the form of disks. At the rear end a similar door 63 is provided, together with an equipment of a rack, gear wheel 64 and crank 65, the space between the lower edge of this door and the apron being designated as 66. The function and operation of this rear door is substantially similar to those of the front-end door 53. The rear door and counterweight connection is designated as 68 and the counterweight as 69. As the bread emerges baked from the rear end of the casing 23 operatives will transfer it to rods, the rods mounted on the trucks in the drying room and pushed successively forward until the drying room is full when the finished bread at the front of the room will be successively removed to make room for new supplies at the rear.

In the top 23' of the casing are a series of ventilating-holes 70 which may be covered or uncovered by a slide 71 having holes 72 therein adapted to be brought into register with the holes 70 as shown in Figs. 3 and 7. This slide, of which there may be a suitable number along the length of the casing, is manipulated by a rod 73 passing through the wall 2″ or 2′, arrangements being made to have similar handles for both ends of the slide so that it may be manipulated from either side of the oven. The construction shown in Fig. 7 represents both sides of the structure. Four such slides and series of openings will ordinarily be the number required for an oven forty feet long. Opposite the holes 70 are ends of pipes 74 adapted to carry away excessive moisture or steam from within the casing.

Referring now to the construction and arrangements within the space 2 below the casing. In this space are placed along each of its sides in the manner indicated in Figs. 1, 3 and 4, a series of portable fire-pots of the construction shown on an enlarged scale in Figs. 5 and 6. Each fire-pot consists of an upper cylindrical section 75 and a lower section 76. In the lower edge of the upper section 75 is a rabbet or groove 77 which is adapted to engage an annular flange 78 on the upper edge of the lower fire-pot section 76. In the upper section 75 is a fuel-opening 79 (Fig. 5) to be closed by a door 80 (Fig. 1). In the lower section 76 is an opening 81 for an ash-pan 82. The lower section 76 also carries the grate-bars 83 (Fig. 4) on which are supported a grate 84. A slot or opening 85 (Fig. 6) is made in the front side of the fire-pot section 76, and of a sufficient length and width to permit insertion and removal of the grate, so that burnt-out grates may be replaced without removing or taking apart the fire-pot itself. The lower fire-pot section is also formed with a ledge 86 on its interior wall as a means for supporting the grate or its supports. In the side walls 2' and 2″ an opening 87 is made for each fire-pot, and this opening is controlled by a door 88.

The fire-pots are arranged in pairs arranged from side to side as shown in Fig. 4, and between these pairs partition walls 89 are placed. These walls extend from the bottom of the space 2 up to a point substantially on a level with the tops of the fire-pots as shown in Fig. 2. These partition walls are extended to the top of the space 2 by dampers 90 and 91 which may be swung to afford more or less freedom of circulation of heated air underneath the casing and from one space between partitions 89 to another, several of these spaces being designated as 92 and 93. The dampers 90 and 91 are hung on pivot-rods 94 shown in Figs. 3 and 4 as projecting through both walls 2' and 2″ so that the dampers may be operated from either side of the oven. These rods are provided with knobs 95 and 96 made of some poor conductor of heat for the convenience of their manipulator. In Fig. 2 dotted lines show one of the dampers (91) in its open position. Between the outside walls 2' and 2″ and the knobs the rods 94 have shrunk on, or otherwise secured thereto, collars 97 and between these collars and the walls, and around the rods 94, are interposed springs 98 which by frictional engagement with the outside walls and the collars tend to hold the dampers against rotation from any position in which they are placed by the operator. The walls 89 may be said to be continued on the upper side of the casing 23 by walls 99 and 100 which extend from the top 23' to the sheet-iron floor 25 in the vertical planes of the lower walls 89. These partitions have on their ends vertical and downwardly extending legs or lateral extensions 101 which partition off the spaces 28 in like manner, as shown in Fig. 7. A thermostat 102 readable from the outside is provided for each of the subdivisions vertically of the heat areas. By suitable controls through the dampers and slides referred to the heat above and below the casing may be distributed to give greater heat above the baking bread at a given point of its path of movement, than is admitted to the same point below, and vice-versa, by opening or closing certain openings leading from below to the spaces 28 and opening or closing certain dampers such as 90 and 91. As stated, the raising of the bread may have to be completed after it is placed on the apron, and as the baking process of these thin disks is rapid and this peculiar kind of bread must be made with considerable skill in order that it shall equal in quality the product of foreign countries where the art of making it has reached a high state of development, the conditions of temperature, speed of baking, distribution of heat at different points, etc., are of exceptional importance. The heat compartments above the compartments 92 and 93 are designated, respectively, as 103 and 104 and are not limited in number to those shown, as Figs. 2 and 4 are broken away where they would be duplicated rearwardly.

The flues for the gases of combustion are arranged in a horizontal plane below the casing and zig-zag back and forth from the fire-pots to the chimneys 105 and 106 with an elbow-extension at each bend opening through the respective walls as shown in Fig. 4, through which access may be had to the interior of the flues for flue-cleaning devices. By passing the flues back and forth diagonally in the manner shown in the plan view Fig. 4 the heat passing through the flues is caused to greatly assist in heating the oven and produce a considerable saving in fuel-expenses, so much so, in connection with the other arrangements above-described, that I estimate I can operate the apparatus at an expense for fuel of about 15 cents per day for each fire-box. Referring to the flue arrangements for the first fire-pots to the right in Figs. 2, 3 and 4, which arrangement is substantially duplicated for the succeeding pairs of fire-pots, the fire-pot in the lower right hand corner of Fig. 4 is connected with a leg 107 which passes diagonally across the space 2 and connects with an elbow extension 108 which passes through an opening 109 in the wall 2''. The mouth of this extension is closed at the outside of the wall by a cover 110 which is removably mounted so that it may be easily removed when the flue is to be cleaned. Returning diagonally in the opposite direction the flue-leg 107 is continued in a leg 111 to which also access may be had through the extension 108. At the wall 2' there is another extension 112 closed by a cover 113, and so on to one of the chimneys. In like manner the fire-pot in the upper right hand corner of Fig. 4 is equipped its diagonal legs crossing over or under the first mentioned legs. The remaining pairs of fire-pots, designated in Fig. 4 as 114 and 115 have short flue sections 116 and 117, respectively, which connect with the diagonal legs midway between the elbow-extensions 108 and 112. The fuel used in these fire-pots may be either coke, wood and hard or soft coal.

Having thus described my invention, I claim as new and desire to secure by Letters Patent—

The combination with a baking oven, of a casing open at both ends, an endless apron having a run passing through said casing, a fire pot chamber and a series of individual fire-pots underneath said casing, a series of vertical partitions dividing said chamber, means for admitting heat from one partition to another, an inclosure having a series of partitions above said casing, damper-controlled passages for admitting heat to or withholding heat from the spaces between the last mentioned partitions, and valve-controlled ventilating passages leading to the outer air from said casing.

In testimony whereof I have hereunto set my hand in the presence of two subscribing witnesses.

SWAN G. BONAPARTE.

Witnesses:
M. C. ALLEN,
J. W. BECKSTROM.